(12) United States Patent
Qureshi

(10) Patent No.: US 8,572,493 B2
(45) Date of Patent: Oct. 29, 2013

(54) MOBILE DEVICE MESSAGING APPLICATION

(76) Inventor: Rick Qureshi, San Francisco, CA (US)

(*) Notice: Subject to any disclaimer, the term of this patent is extended or adjusted under 35 U.S.C. 154(b) by 384 days.

(21) Appl. No.: 12/696,946

(22) Filed: Jan. 29, 2010

(65) Prior Publication Data

US 2010/0251137 A1 Sep. 30, 2010

Related U.S. Application Data

(60) Provisional application No. 61/148,351, filed on Jan. 29, 2009.

(51) Int. Cl.
*G06F 3/00* (2006.01)

(52) U.S. Cl.
USPC ........... 715/742; 715/747; 715/752; 715/753; 715/758; 715/759; 715/789; 715/811

(58) Field of Classification Search
USPC ......... 715/752, 745, 742, 747, 753, 758, 759, 715/789, 811
See application file for complete search history.

(56) References Cited

U.S. PATENT DOCUMENTS

| | | | |
|---|---|---|---|
| 2002/0080185 A1* | 6/2002 | Boeuf | 345/802 |
| 2004/0125073 A1* | 7/2004 | Potter et al. | 345/156 |
| 2004/0249650 A1* | 12/2004 | Freedman et al. | 705/1 |
| 2006/0164382 A1* | 7/2006 | Kulas et al. | 345/156 |
| 2007/0150368 A1* | 6/2007 | Arora et al. | 705/26 |
| 2007/0255807 A1* | 11/2007 | Hayashi et al. | 709/219 |
| 2008/0086431 A1* | 4/2008 | Robinson et al. | 706/11 |
| 2008/0222295 A1* | 9/2008 | Robinson et al. | 709/227 |
| 2009/0063637 A1* | 3/2009 | Sun et al. | 709/206 |
| 2009/0106113 A1* | 4/2009 | Arora et al. | 705/14 |
| 2009/0172108 A1* | 7/2009 | Singh | 709/206 |
| 2009/0177980 A1* | 7/2009 | Leahy et al. | 715/757 |
| 2009/0183089 A1* | 7/2009 | Leahy et al. | 715/757 |
| 2009/0228809 A1* | 9/2009 | Leahy et al. | 715/757 |
| 2009/0322761 A1* | 12/2009 | Phills | 345/473 |
| 2010/0045619 A1* | 2/2010 | Birnbaum et al. | 345/173 |
| 2010/0149094 A1* | 6/2010 | Barnes et al. | 345/156 |
| 2010/0156676 A1* | 6/2010 | Mooring et al. | 341/20 |
| 2010/0179991 A1* | 7/2010 | Lorch et al. | 709/206 |
| 2010/0203877 A1* | 8/2010 | Yamashita et al. | 455/418 |
| 2010/0218664 A1* | 9/2010 | Toledano et al. | 84/615 |
| 2011/0191413 A1* | 8/2011 | Leahy et al. | 709/203 |
| 2011/0206198 A1* | 8/2011 | Freedman et al. | 379/265.03 |
| 2012/0124486 A1* | 5/2012 | Robinson et al. | 715/753 |
| 2012/0278740 A1* | 11/2012 | Robinson et al. | 715/757 |

FOREIGN PATENT DOCUMENTS

JP 2005005988 A * 1/2005

OTHER PUBLICATIONS www.encyclopedia.com/topic/color.aspx, UXL Encyclopedia of Science, Color, 2002, HighBeam™ Research Inc ©.*
Bing search q=audio+profile+text+message+voice+v Jun. 6, 2013.*
Bing search q=audio+profile+text+message+voip+mo Jun. 6, 2013.*
Bing search q=audio+profile+text+message+voip+mo b Jun. 6, 2013.*
Bing search q=audio+profile+text+message+voip+mo c Jun. 6, 2013.*
encyclopedia.com, www-encyclopedia-com--topic--color, 2002.*

* cited by examiner

*Primary Examiner* — Boris Pesin
*Assistant Examiner* — John Heffington
(74) *Attorney, Agent, or Firm* — Ray K. Shahani, Esq.; Kin Hung Lai

(57) ABSTRACT

A social networking mobile software application for particular mobile device which allow end users on their mobile devices to view profiles of themselves that contain images and/or videos while simultaneously hearing and audio description of their ad via wireless connection to the internet and/or cellular provider data network using streaming or intact multimedia file.

19 Claims, 21 Drawing Sheets

MOBILE DEVICE MESSAGING APPLICATION

RELATED APPLICATIONS

This Application is a Non-provisional application and related to pending U.S. Provisional Patent Application Ser. No. 61/148,351 filed Jan. 29, 2009 entitled MOBILE DEVICE MESSAGING APPLICATION, which is incorporated herein by reference in its entirety, and claims any and all benefits to which it is entitled therefrom.

FIELD OF THE INVENTION

The present invention relates to accessing audio and video content concurrently with text and images for mobile, handheld cellular devices and systems and methods for delivery to end-users.

BACKGROUND OF THE INVENTION

In approximately year 2000 companies started introducing the ability to send voice message as an attachment in an email. However, it was limited only to specific known email addresses, not in response to social network profiles, such as Facebook, MySpace, Twitter, etc., which offer some degree of anonymity where the user may only be known by an avatar or alias.

Online social networks allow voice and video uploads but they didn't have a seamless way of doing it from a handheld device over a cellular network such as a Smartphone. Additionally the video or audio files had to be recorded by another application, after which the user would have to log in to the social network using a browser and upload the file.

Other applications running on a handheld device that operate on Wi-Fi and cellular data networks allow uploading recorded audio and video to social networks but they didn't allow you to view profiles, record an audio or video response and upload it at the time the provisional application was filed.

Other social networking applications such as Twittelator and Twit Bird that run on mobile handheld devices exist today that allow you to record audio/video and respond to a profile but they don't allow you to select a color to display messages from a specific user in. And further they do not allow the color to be selected by mixing a combination of red, green and blue primary colors.

Other social networking applications that run on mobile handheld devices exist today that allow you to record audio/video and respond to a profile but they don't allow you to have multiple columns (or screens) displaying each account, different information from the same account or public information from the social network that are traversed by "swiping gestures" on a touch screen or by arrow keys (either mechanical or virtual).

U.S. Pat. No. 7,188,153, to Lunt, et al. issued Mar. 6, 2007 disclosed a system and method for managing connections in an online social network which indicates other individuals with whom they have a personal relationship with. The descriptive data and the relationship data are integrated and processed to reveal the series of social relationships connecting any two individuals within a social network. A maximum degree of separation setting is provided and set to at least two. The maximum degree of separation setting limits the amount of searching that is carried out when searching for a connection between two individuals in the social network.

An online social network collects descriptive data about various individuals and allows those individuals to indicate other individuals with whom they have a personal relationship. The descriptive data and the relationship data are integrated and processed to reveal the series of social relationships connecting any two individuals within a social network. A maximum degree of separation setting is provided and set to at least two. The maximum degree of separation setting limits the amount of searching that is carried out when searching for a connection between two individuals in the social network.

SUMMARY OF THE INVENTION

The method of inducing content uploads in a social network disclosed a method of inducing content uploads in an online network includes the steps of storing content relating to a first member of the network that is submitted by a second member of the network, receiving approval of the content from the first member, and associating the content with the first member. The uploaded content may comprise an image file containing a photo of the first member and a caption associated with the photo image. The second user uploads the content relating to the first member using a GUI. This GUI is made available to the second user through a hyperlink that appears when a profile page of the first member is accessed if the degree of separation between the first member and the second member is less than or equal to a maximum degree of separation set by the first user. On the other hand, the hyperlink to this GUI will not appear when the profile page of the first member is accessed by the second member if the degree of separation between the first member and the second member is greater than the maximum degree of separation set by the first user. The default setting for this maximum degree of separation is one.

A method and apparatus for calculating, displaying and acting upon relationships in a social network is described. A computer system collects descriptive data about various individuals and allows those individuals to indicate other individuals with whom they have a personal relationship. The descriptive data and the relationship data are integrated and processed to reveal the series of social relationships connecting any two individuals within a social network. The pathways connecting any two individuals can be displayed. Further, the social network itself can be displayed to any number of degrees of separation. A user of the system can determine the optimal relationship path (i.e., contact pathway) to reach desired individuals. A communications tool allows individuals in the system to be introduced (or introduce themselves) and initiate direct communication.

The following definitions shall be used for terms found herein:

Descriptive Data. Information that describes a user or characteristics of a user. For example, descriptive data might include a first and last name. Or it might include elements that describe attributes of the user, such as gender, marital status or occupation.

Friend. In an exemplary implementation of the system, the list of users who have accepted invitations from a user to join the system or have otherwise been designated as having a direct (i.e., one degree) relationship with the user.

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations that may be made in the future, including changes and additions to existing standard protocols.)

Interface. Any mechanism by which an external individual or external computer can obtain and provide data, respectively to or from the database of the present invention. One common example of the interface is a web site. Other examples might include an e-mail message, a telephone voice message or a paper report.

Intermediate acquaintance(s). The individual or individuals connecting any two other individuals in a social network. For example, if A is connected to B through C and D (i.e., A<>C<>D<>B) then C and D are the intermediate acquaintances.

Mutual acquaintance. See "Intermediate Acquaintance"

Relationship Data. Information about the friends of a user of the system. Can include the list of friends, list of individuals invited to join the system, etc.

Social Network. An aggregation of individual social relationships, out to any number of degrees of separation.

User. An individual who has registered in the system.

Web Site. A computer system that serves informational content over a network using the standard protocols of the World Wide Web. As used herein, the term is generally intended to encompass both (i) the hardware/software server components that serve the informational content over the network, and (ii) the "back end" hardware/software components, including any non-standard or specialized components, that interact with the server components to perform services for Web site users.

The present invention includes software application running on multiple wireless devices (iPhone, Blackberry, etc.) to allow end users to receive ads or profiles in the form of images, text while simultaneously listening to audio transferred to their wireless device via a wireless connection to the internet or via the cellular provider's data network (including but not limited to 3G networks) over the internet from a server or set of servers.

The present invention includes software application to allow end users of multiple wireless devices to send and receive voice messages to each other by selecting their ad or profile utilizing a wireless connection over the internet, or via the cellular provider's data network (including but not limited to 3G networks to a server or to the sender/receivers wireless devices directly.

The present invention also includes social networking application running on iPhone™ or Blackberry™ to allow end users to receive ads or profiles in the form of images, text while simultaneously listening to audio transferred to their wireless device via a wireless connection to the internet or via the cellular provider's data network (including but not limited to 3G networks) over the internet from a server or set of servers.

The present invention also includes social networking application to allow end users of an iPhone or Blackberry to send and receive voice messages to each other by selecting their ad or profile utilizing a wireless connection over the internet, or via the cellular provider's data network (including but not limited to 3G networks to a server or to the sender/receivers wireless devices directly.

The present invention also includes eCommerce application running on iPhone™ or Blackberry™ to allow end users to receive ads or profiles in the form of images, text while simultaneously listening to audio transferred to their wireless device via a wireless connection to the internet or via the cellular provider's data network (including but not limited to 3G networks) over the internet from a server or set of servers.

The present invention also includes eCommerce application to allow end users of an iPhone™ or Blackberry™ to send and receive voice messages to each other by selecting their ad or profile utilizing a wireless connection over the internet, or via the cellular provider's data network, including but not limited to 3G networks to a server or to the senders/receivers wireless devices directly.

A software application for a handheld device to allow end users on mobile devices or desktop computers (i.e. iPhone, Blackberry, Treo (though outdated)) to view profiles of themselves that contain image(s) and/or video while simultaneously hearing and audio description of their ad via wireless connection to the internet and/or the cellular provider data network (streaming or intact multimedia file). A software application for a handheld device to allow end users on mobile devices to record, send, receive and playback voice messages to other users running the same application after selecting the initiating user selects the other user's profile utilizing the cell phone's microphone and speaker via Wi-Fi cellular data path (included but not limited to VoIP, WAV, VOX, WMV, MOV, 3GG file formats). A software application for a handheld device that allows users to have a live conversation which each other, utilizing VoIP with a wireless internet connection or the cellular data path with VoIP after the initiating user selects on the other user's profile.

A software application for a handheld device that allows multiple end users on mobile devices to have a live conversation or pass voice messages to each other, utilizing method described above allowing multiple users to join what is referred to in the industry as a "chat room". Software application running on multiple wireless devices (iPhone, Blackberry, etc.) to allow end users to receive ads or profiles in the form of images, text while simultaneously listening to audio transferred to their wireless device via a wireless connection to the internet or via the cellular provider's data network (including but not limited to 3g networks) over the internet from a server or set of servers.

Software application to allow end users of multiple wireless devices to send and receive voice messages to each other by selecting their ad or profile utilizing a wireless connection over the internet, or via the cellular provider's data network (including but not limited to 3g networks to a server or to the sender/receivers wireless devices directly. Application running on iPhone or Blackberry to allow end users to receive ads or profiles in the form of images, text while simultaneously listening to audio transferred to their wireless device via a wireless connection to the internet or via the cellular provider's data network (including but not limited to 3g networks) over the internet from a server or set of servers. Software application to allow end users of an iPhone or Blackberry to send and receive voice messages to each other by selecting their ad or profile utilizing a wireless connection over the internet, or via the cellular provider's data network (including but not limited to 3g networks to a server or to the sender/receivers wireless devices directly. eCommerce application running on iPhone or Blackberry to allow end users to receive ads or profiles in the form of images, text while simultaneously listening to audio transferred to their wireless device via a wireless connection to the internet or via the cellular provider's data network (including but not limited to 3g networks) over the internet from a server or set of servers. eCommerce application to allow end users of an iPhone or Blackberry to send and receive voice messages to each other by selecting their ad or profile utilizing a wireless connection over the internet, or via the cellular provider's data network (including but not limited to 3g networks to a server or to the sender/receivers wireless devices directly.

Software application as described in terms 1 thru 8 that allows custom colors to be set for each user messages are received from. Software application as described in terms 1 thru 8 that allows screens displaying messages received from different accounts to be traversed by a "swiping gesture". Software application as described in terms 1 thru 8 that allows screens displaying messages received from different accounts to be traversed by arrow keys. Either by mechanical or virtual keyboard. Social networking application as described in terms 1 thru 13 that interconnects only mobile handheld devices. Any messaging application that allows colors custom colors for senders and recipient messages to be set. Social networking application that allows custom colors for messages from a specific user to be set. It also provide means to control for mixing red, green and blue primary colors. Additionally, it allows user to change the theme by shaking the device, to save messages to the devices own contacts management application, email messages originating from the social network. It also integrates with the device's web browser to display web pages, photos, play video and audio.

DETAILED DESCRIPTION OF THE EMBODIMENT

Figure 1:
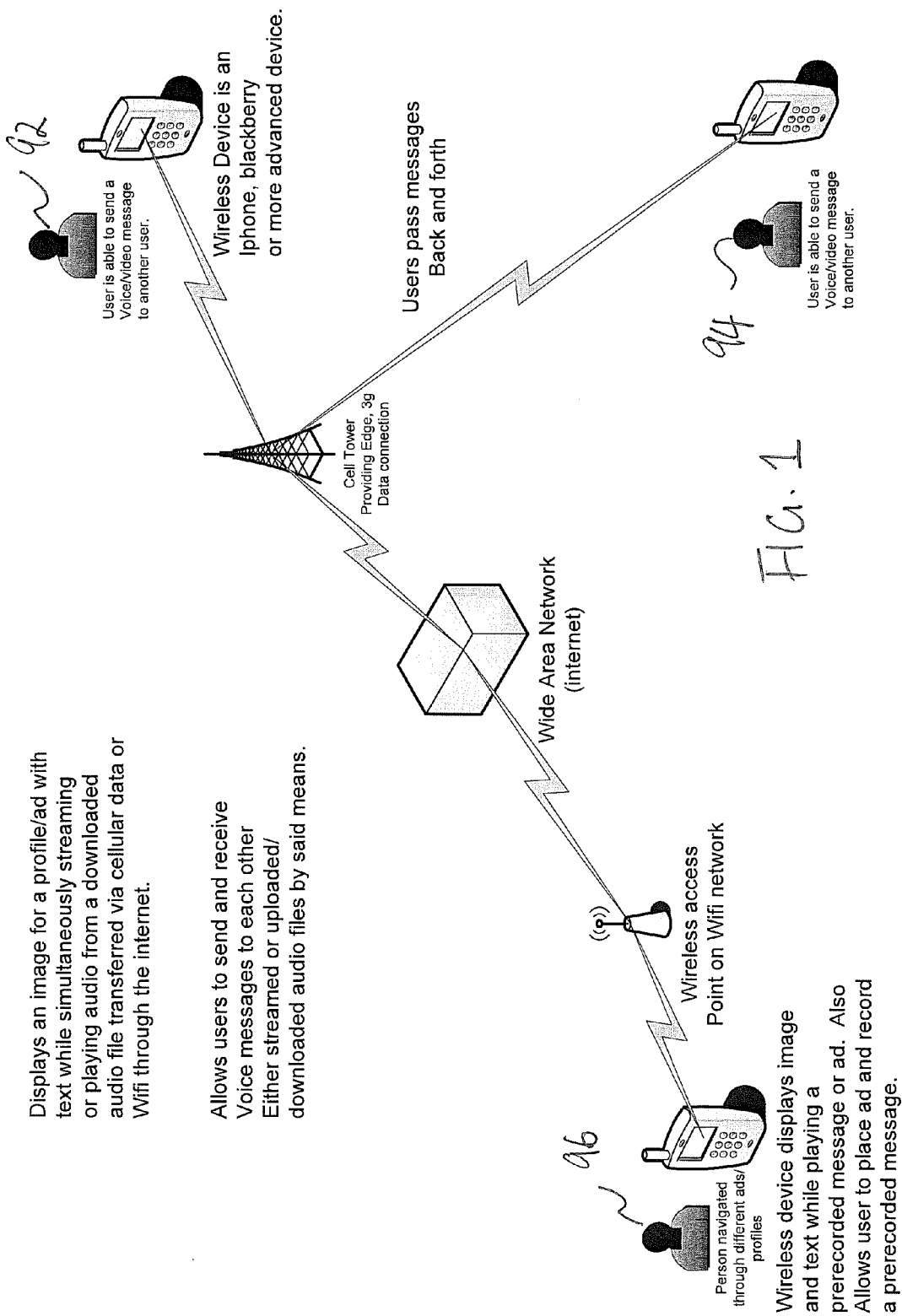
FIG. 1 is a representative diagram of the mobile device messaging application 100 of the present invention.

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

It will be understood that in the event that component parts of different embodiments have similar structure, functions or uses, they may have been given similar or identical reference numerals and descriptions. It will be understood that such duplication of reference numerals is intended solely for clarity, consistency and ease of understanding the present invention, and are not to be construed as limiting in any way or as implying, for example, that the various embodiments themselves are identical.

FIG. 1 is a representative diagram of the mobile device messaging application 100 of the present invention. The mobile device messaging application 100 of the present invention of runs on any smart phones such as Apple™'s iPhone™, Blackberry™ and iPod™ touch devices. In one embodiment, the program is written in the Objective C programming language. Porting the code to other mobile platforms such as Droid™ is viable, expected and planned.

An online social network collects descriptive data about various individuals and allows those individuals to indicate other individuals with whom they have a personal relationship. The descriptive data and the relationship data are integrated and processed to reveal the series of social relationships connecting any two individuals within a social network. A maximum degree of separation setting is provided and set to at least two. The maximum degree of separation setting limits the amount of searching that is carried out when searching for a connection between two individuals in the social network.

As best shown in FIG. 1, in one embodiment, with the launch of the present invention 100, users can display an image for profiles or ads, via WiFi or cellular data connection, e.g. 3G through the internet, from social internet network such as Facebook with text while simultaneously streaming or playing audio from an uploaded/downloaded audio filer. The present invention 100 also allows users to record, upload, send and voice messages to other users on most online social network such as Twitter and receive and play audio filer/messages transferred via cellular data or WiFi through the internet.

As shown in FIG. 1, user 92 who has a hand-held 3G or more advanced wireless device such as an iPhone™ can pass pre-recorded message back and forth with another user 94 who has a hand-held 3G or more advanced wireless device such as an iPhone™. Presently the present invention 100 interfaces to the Twitter social network. Connecting to other social networks such as Facebook is planned for future releases along with the addition of video. Additionally a new social network may be started from users of the application.

Figure 2:
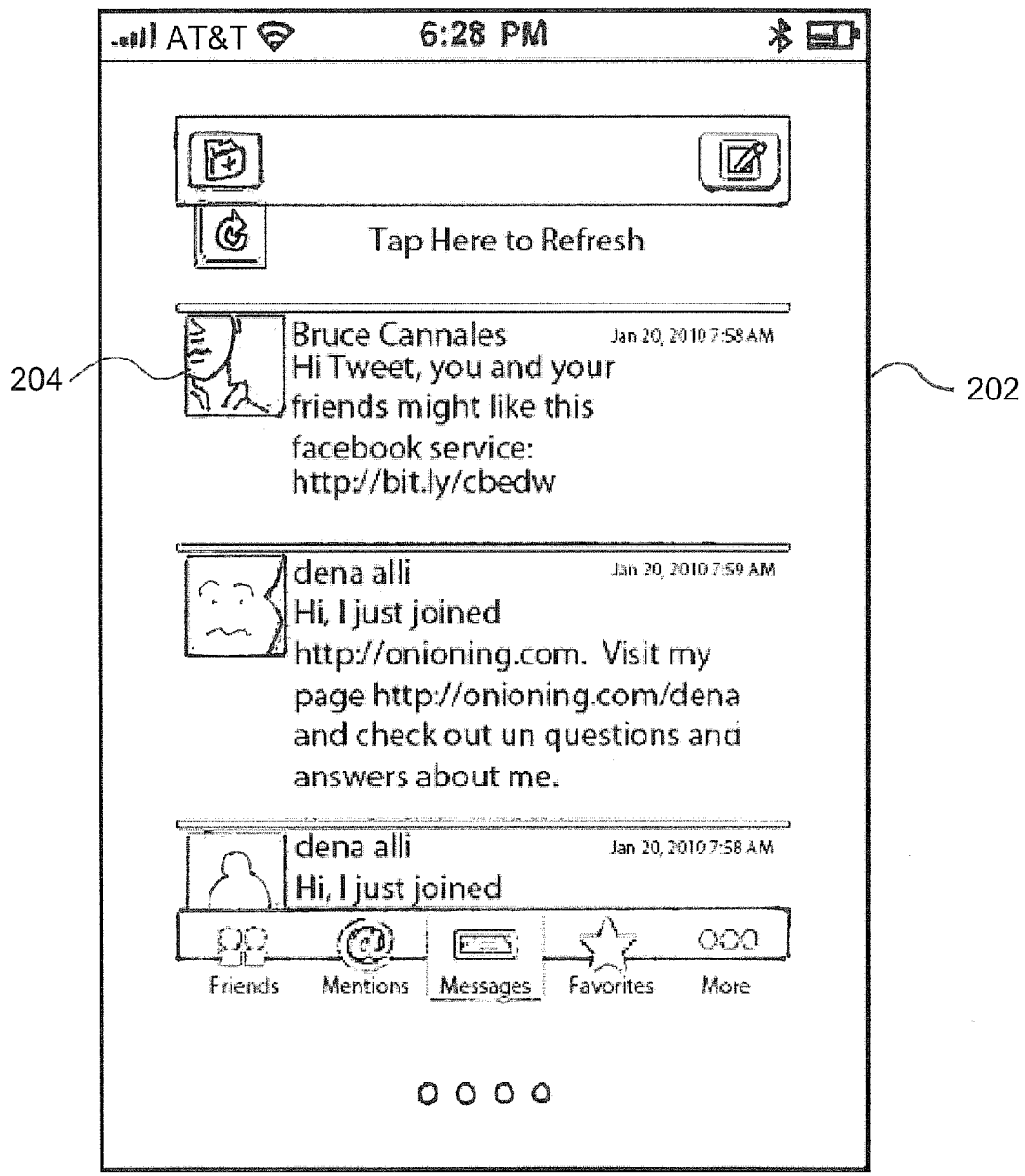
FIG. 2 is a graphic representation of home screen display 202 of the mobile device messaging application 100 of the present invention.

FIG. 2 is a graphic representation of home screen display 202 of the mobile device messaging application 100 of the present invention. When the mobile device messaging application is initiated, the Home screen 202, as shown in FIG. 2 will show. Users can make a swiping gesture on the screen to scroll between different account screens showing profiles and messages. For further examination/action user taps on Home screen 202 to enlarge it. To respond to a profile the user can either tap on the name or tap on the rest of the message area 204 to bring up an intermediate screen 802 as best shown in FIG. 8.

Figure 8:
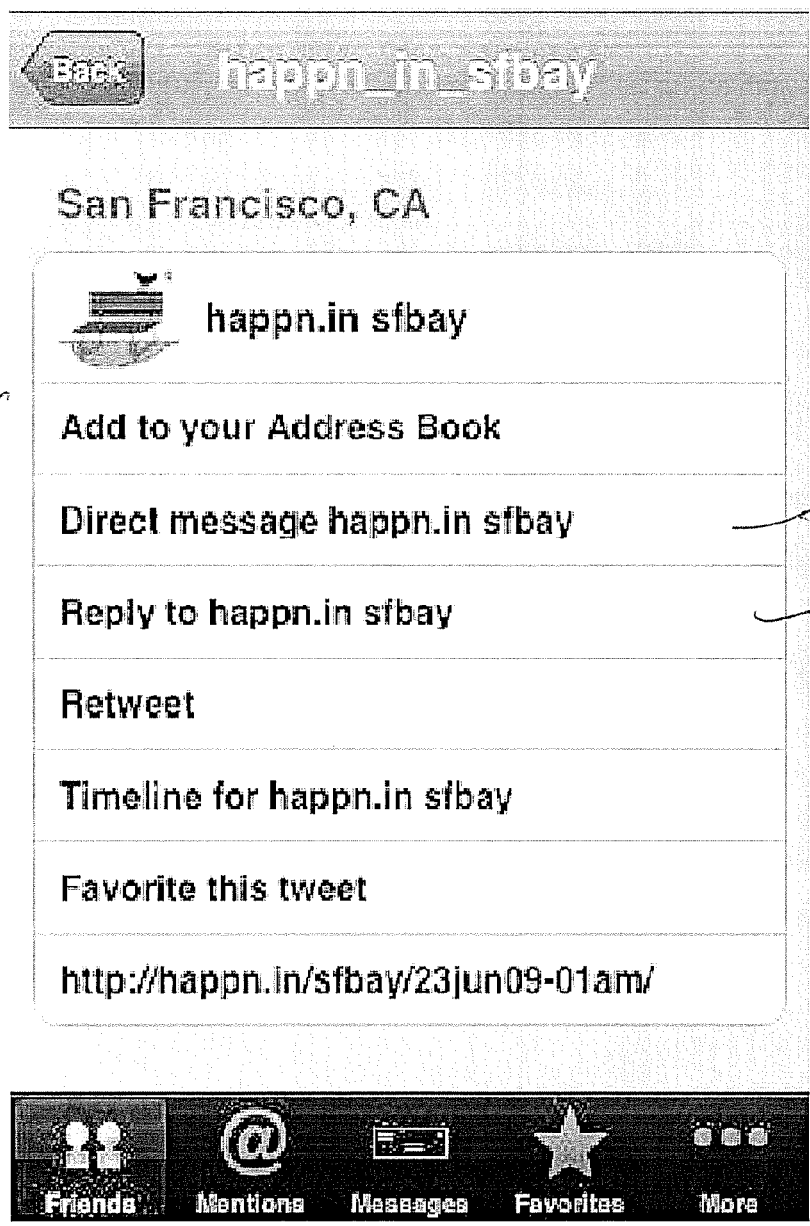
FIG. 8 is a graphic representation of intermediate screen display 802 to handle message of the mobile device messaging application 100 of the present invention.

FIG. 8 is a graphic representation of intermediate screen display 802 to handle message of the mobile device messaging application 100 of the present invention. Then users can tap on either direct message button 804 or reply to button 806 on the intermediate screen 802. With that action, compose screen 502 will appear as best shown in FIG. 5.

Figure 5:
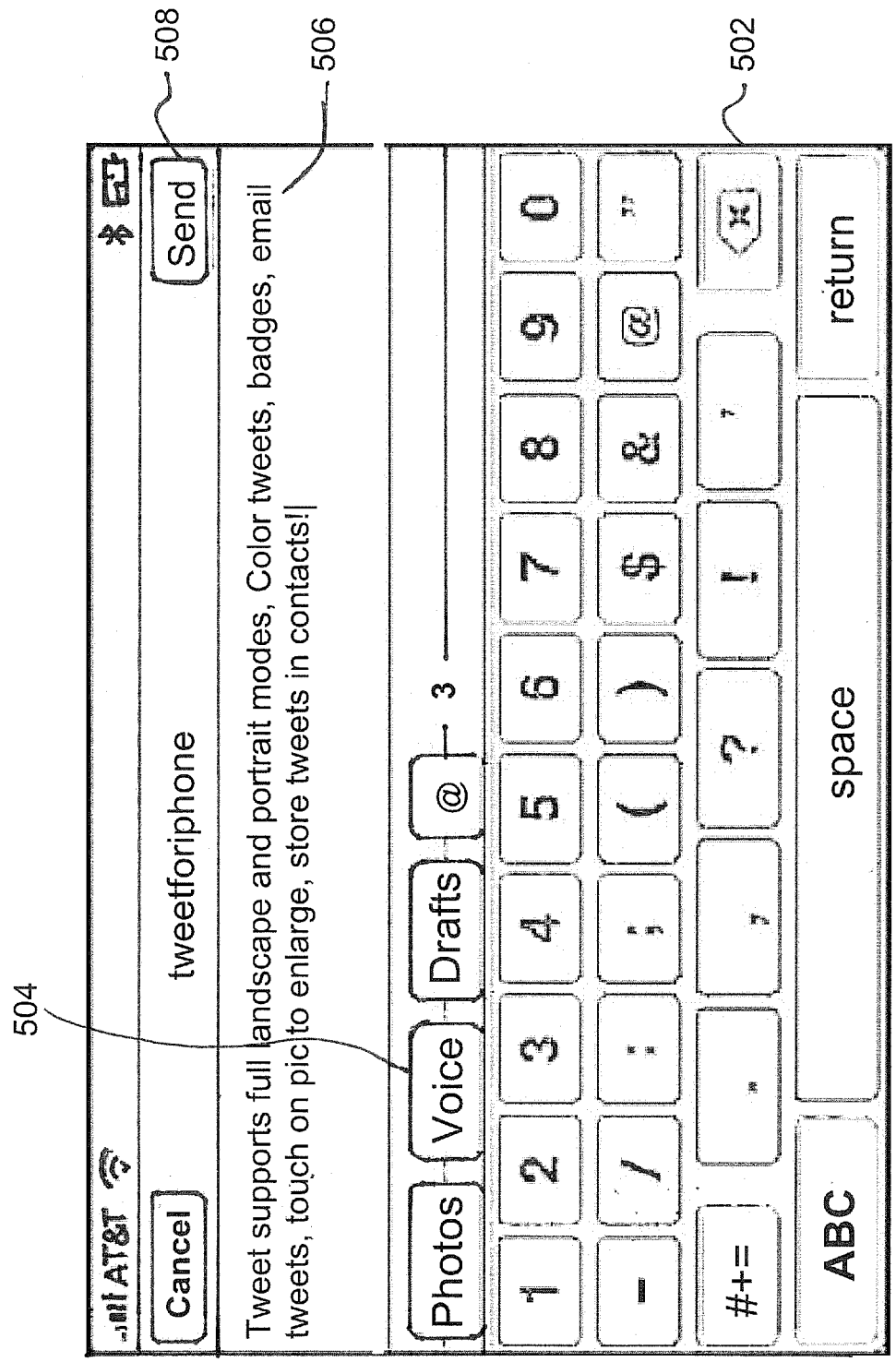
FIG. 5 is a graphic representation of screen display of keyboard view 502 with device in landscape mode showing voice button 504.

FIG. 5 is a graphic representation of screen display of keyboard view 502 with device in landscape mode showing voice button 504. Users can enter a text message 506 and record a voice message by tapping on voice button 504 The pressing of voice button 504 will bring up record screen 602 as best shown in FIG. 6.

Figure 6:
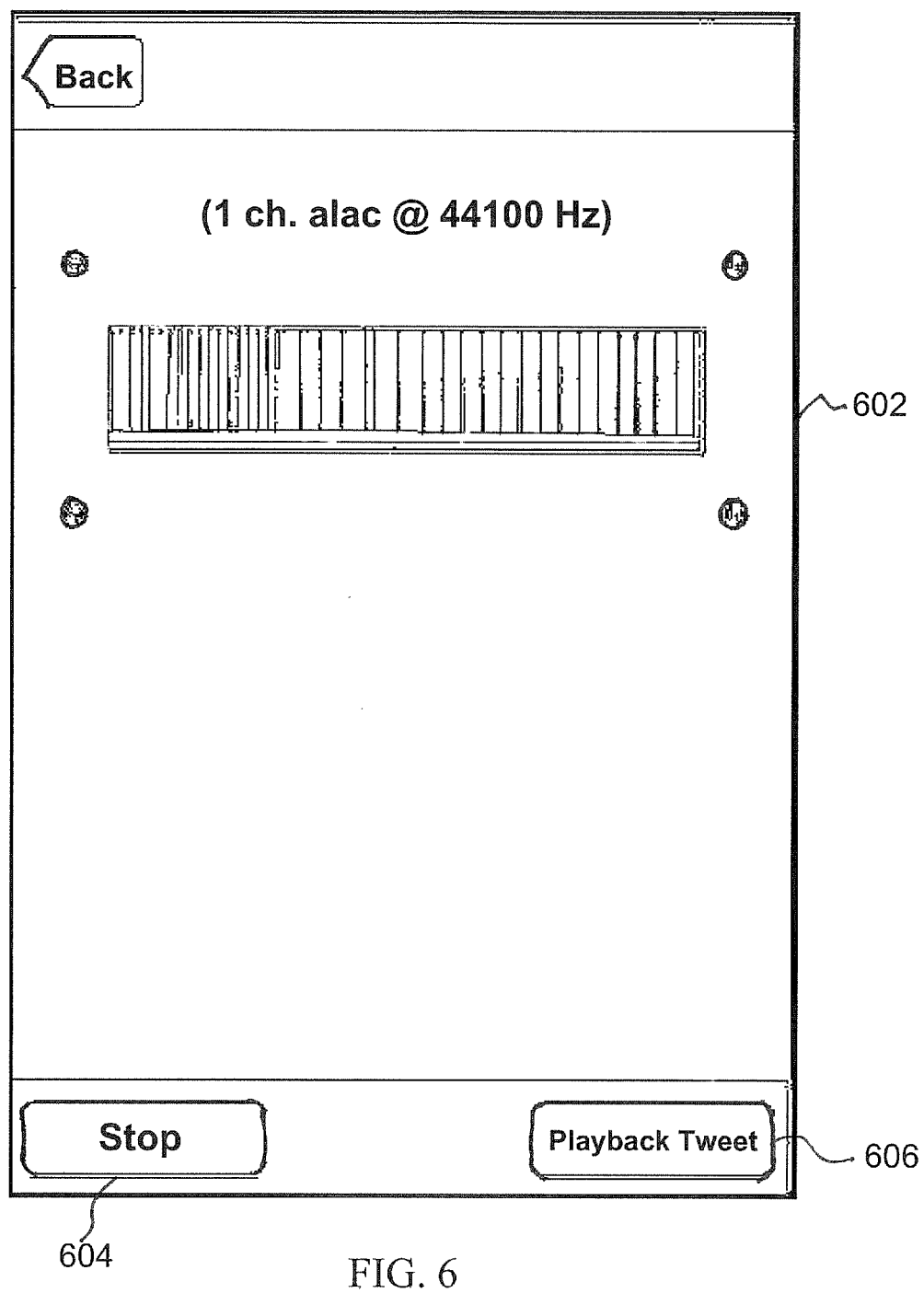
FIG. 6 is a graphic representation of record screen display 602 of the mobile device messaging application 100 of the present invention.
Figure 7:
FIG. 7 is a graphic representation of screen display of keyboard view with search result in portrait mode with a compatible device.

FIG. 6 is a graphic representation of record screen display 602 of the mobile device messaging application 100 of the present invention. Users tap record/stop button 604 on the bottom left of the record screen 602. Before recording, the display of record/stop button 604 is "record". Subsequent to that, user may record an audio recording such as a voice message, music, etc. While audio recording is taking place, the display of record/stop button 604 will change to "stop". When sound recording session is finished, user will press the record/stop button 604 again. In the case that users would like to review the recorded material, they can tap playback button 606 on the lower right. Users can repeat the above process until they are satisfied with their recording. After finishing recording, users will tap back button 608 and is taken back to compose screen 502 as best shown in FIG. 5. Users may proofread, modify their text message and then tap send button 508 to upload their text and voice message to any social network of their choice.

Figure 9:
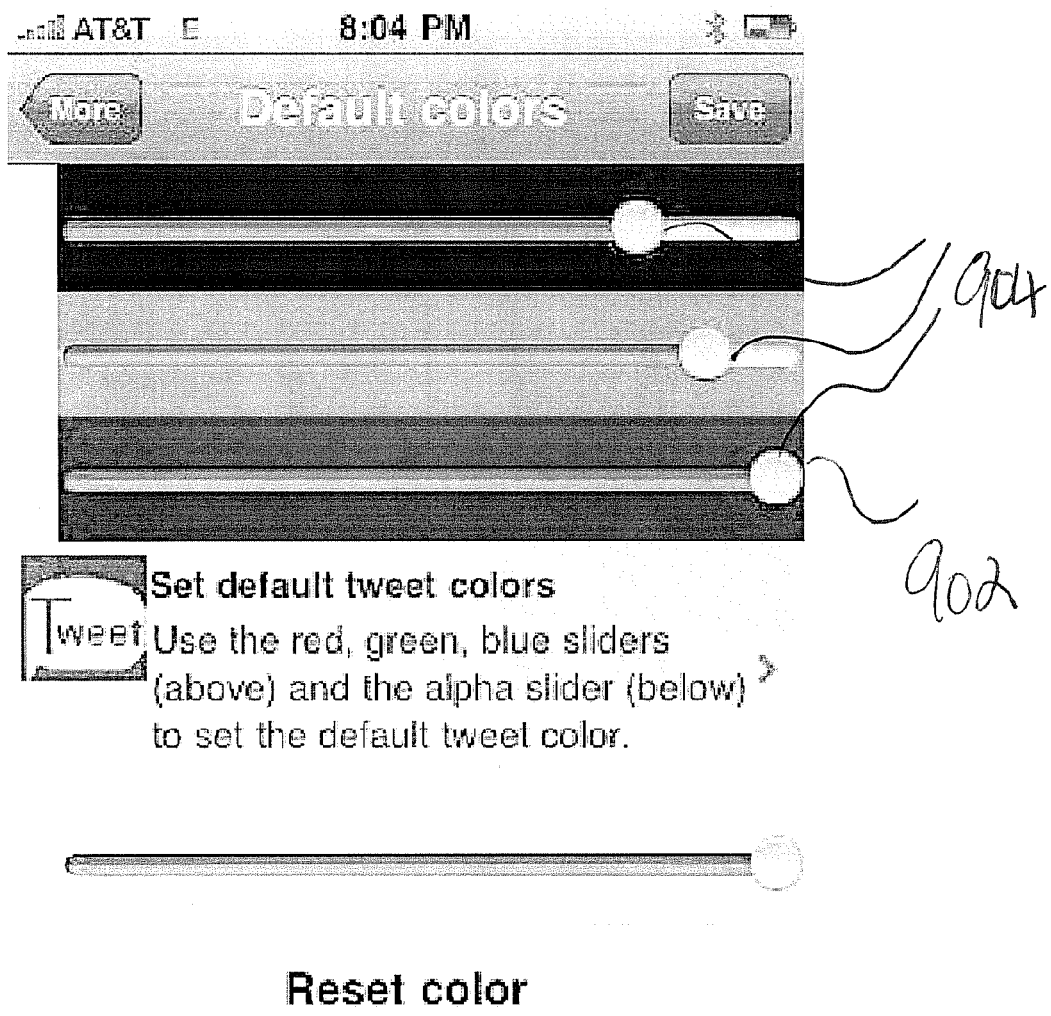
FIG. 9 is a graphic representation of color settings screen display 902 of the mobile device messaging application 100 of the present invention.

FIG. 9 is a graphic representation of color settings screen display 902 of the mobile device messaging application 100 of the present invention. Another unique feature of the application is the custom color settings so that all messages from a particular user appear in a certain pre-determined color. When users enter color settings page 902 as best shown in FIG. 9, a default color setting is available for messages from all users who do not have a custom color saved. As shown in FIG. 9, if users desire to change the default color setting, they can simply manipulate the primary color combination by tap sliding on primary color scales which includes red, green and blue. Additional control scales such as opacity, brightness etc. can be added to make the color setting more refined. The entire mechanism is similar to color mixing/setting controls that are used in graphics applications for desktop computers.

Figure 3:
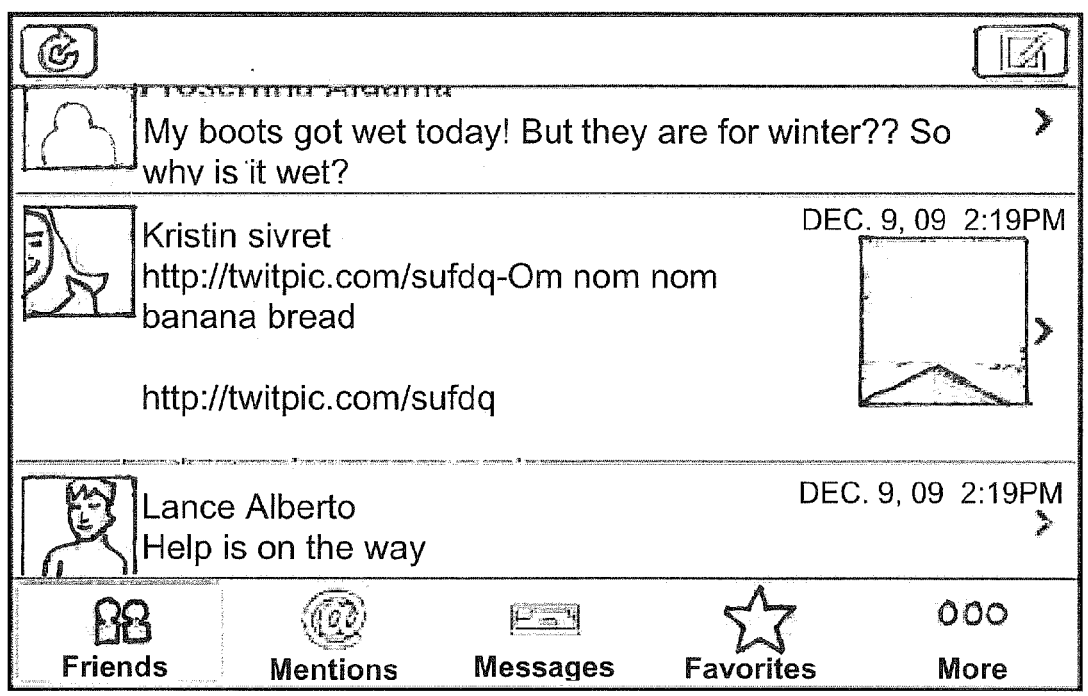
FIG. 3 is a graphic representation of screen display of Friend's timeline in landscape mode with a compatible device.
Figure 4:
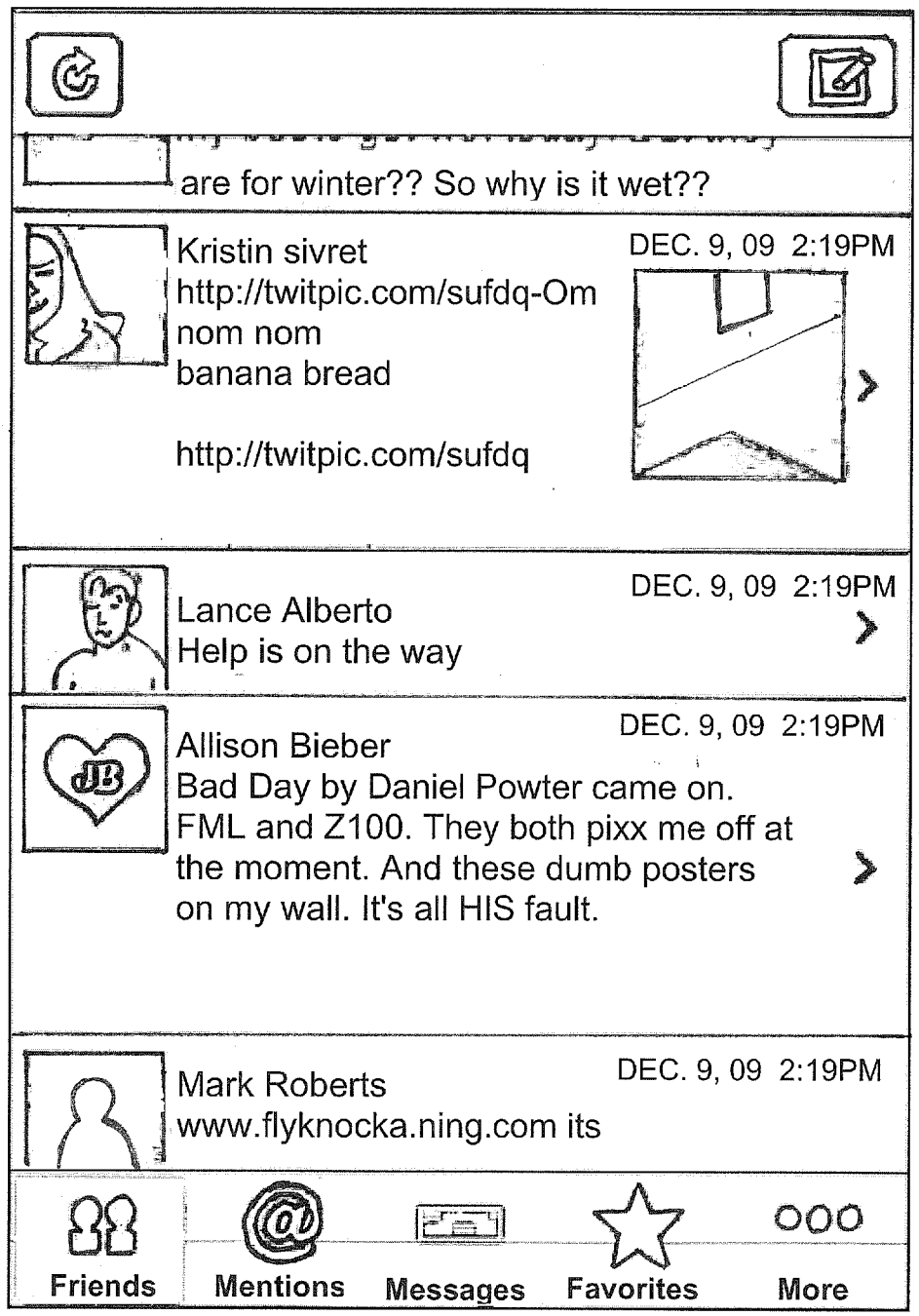
FIG. 4 is a graphic representation of screen display of Friend's timeline in portrait mode with a compatible device.

FIG. 3 is a graphic representation of screen display of Friend's timeline in landscape mode with a compatible device. FIG. 4 is a graphic representation of screen display of Friend's timeline in portrait mode with a compatible device. The application also supports both portrait and landscape modes as best shown in FIGS. 3 and 4. Similar to printing on a piece of paper from a word processor or spreadsheet in portrait or landscape, mobile applications may be programmed with the ability to display their content with the appropriate height and width depending upon how the user is holding the device. For example, on iPhone™ the keyboard letters become wider in landscape mode so it is easier to type with a "landscape" keyboard. As best shown in FIGS. 3 and 4, when users initiate Friend's timeline page 302 from any online social network such as Twitter, if they receive an update from their "Friend" who uploaded a voice recording, an hyper link 304 will appear. If users tap the hyper link 304, providing they have WiFi or cellular provided data connection such as 3G, their mobile device will be able to play back the pre-recorded voice message from their "Friend".

Figure 10:
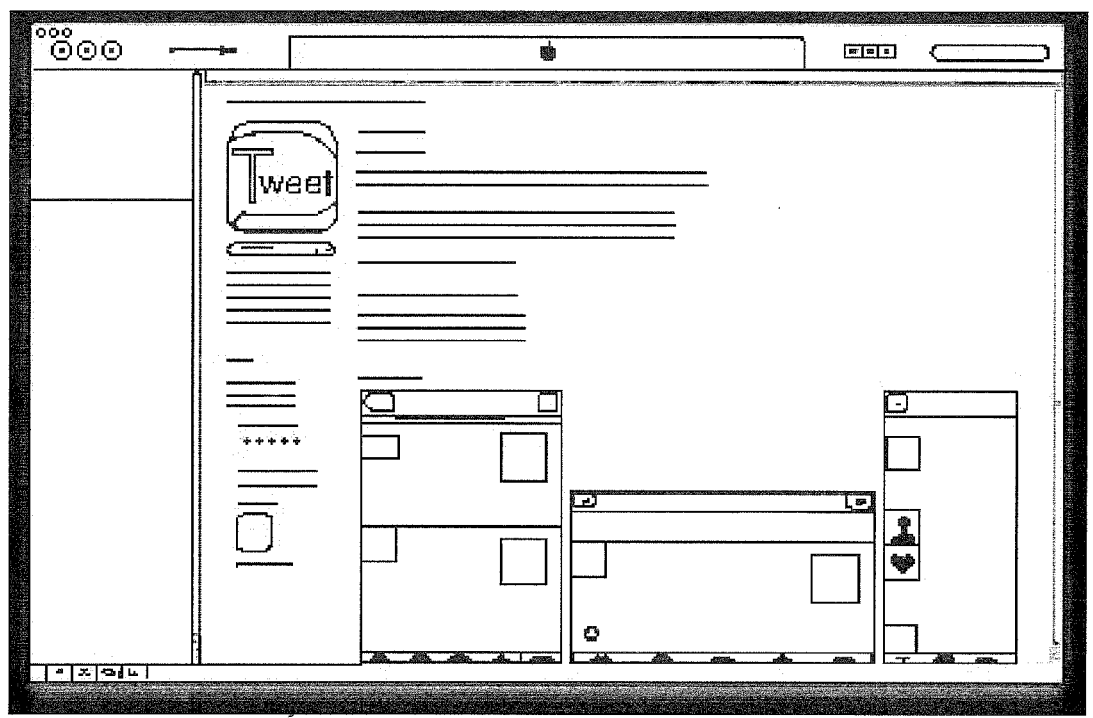
FIG. 10 is a graphic representation of application in Apple™ Application Store of the mobile device messaging application 100 of the present invention.

FIG. 10 is a graphic representation of application in Apple™ Application Store of the mobile device messaging application 100 of the present invention. The present invention 100 also supports both portrait and landscape modes. Similar to printing on a piece of paper from a word processor or spreadsheet in portrait or landscape, mobile applications may be programmed with the ability to display their content with the appropriate height and width depending upon how the user is holding the device. On the iPhone™ the keyboard letters become wider in landscape mode so it is easier to type with a "landscape" keyboard.

Web pages 1002 may be viewed using the device's built in browser as best shown in FIG. 10. If the URL links to video or audio in supported formats it will be played. The application integrates with the iPhone's own contacts list by allowing messages to be stored along with the username and photo. Messages from the social network may be emailed from the application. In one embodiment, shaking the phone will switch to different default display screen themes (photo size, text size, timestamp format, timestamp position). In one embodiment, users can also create their own display screen themes and set as an default or altering existing default display screen themes.

The application has the ability to store drafts of text messages when there is no internet connectivity available and/or at the user's discretion. Further enhancements for the application are the ability to store draft recordings before sending and the ability to automatically play back audio after each timeline of new messages downloads.

Figure 11:
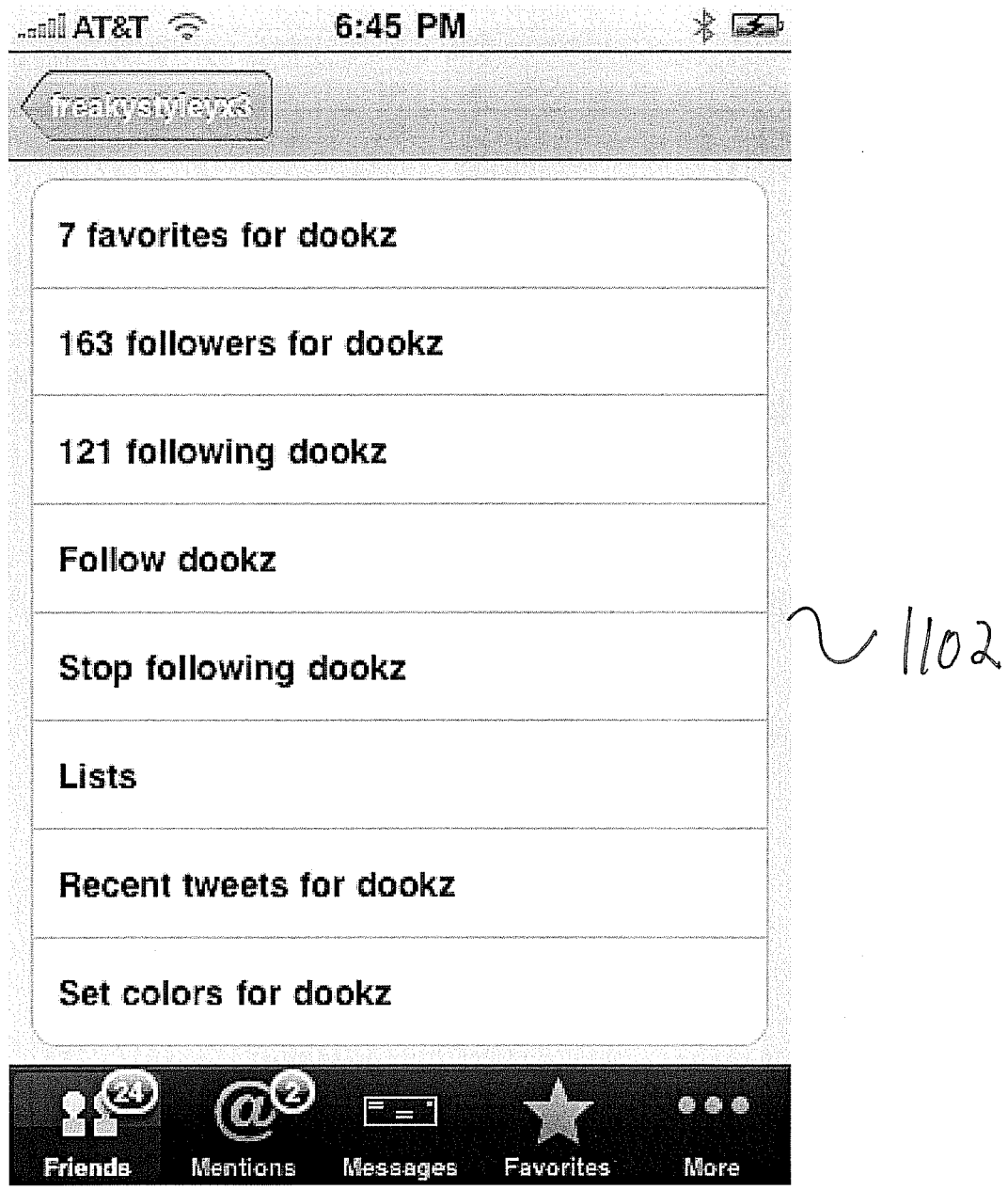
FIG. 11 is a graphic representation of user more information screen display 1102 of the mobile device messaging application 100 of the present invention.
Figure 12:
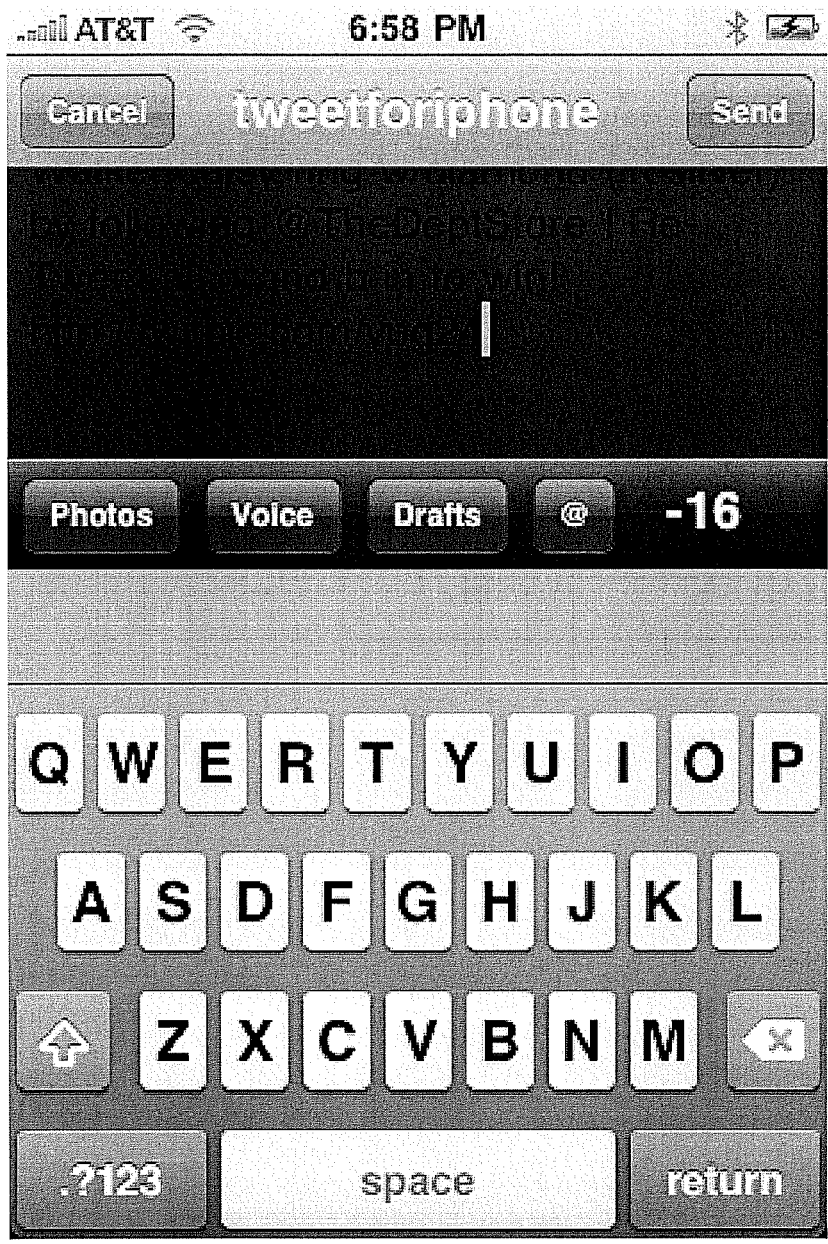
FIG. 12 is a graphic representation of the compose screen turning red 1202 of the mobile device messaging application 100 of the present invention when the user exceeds the number of characters allowed for their message display.
Figure 13:
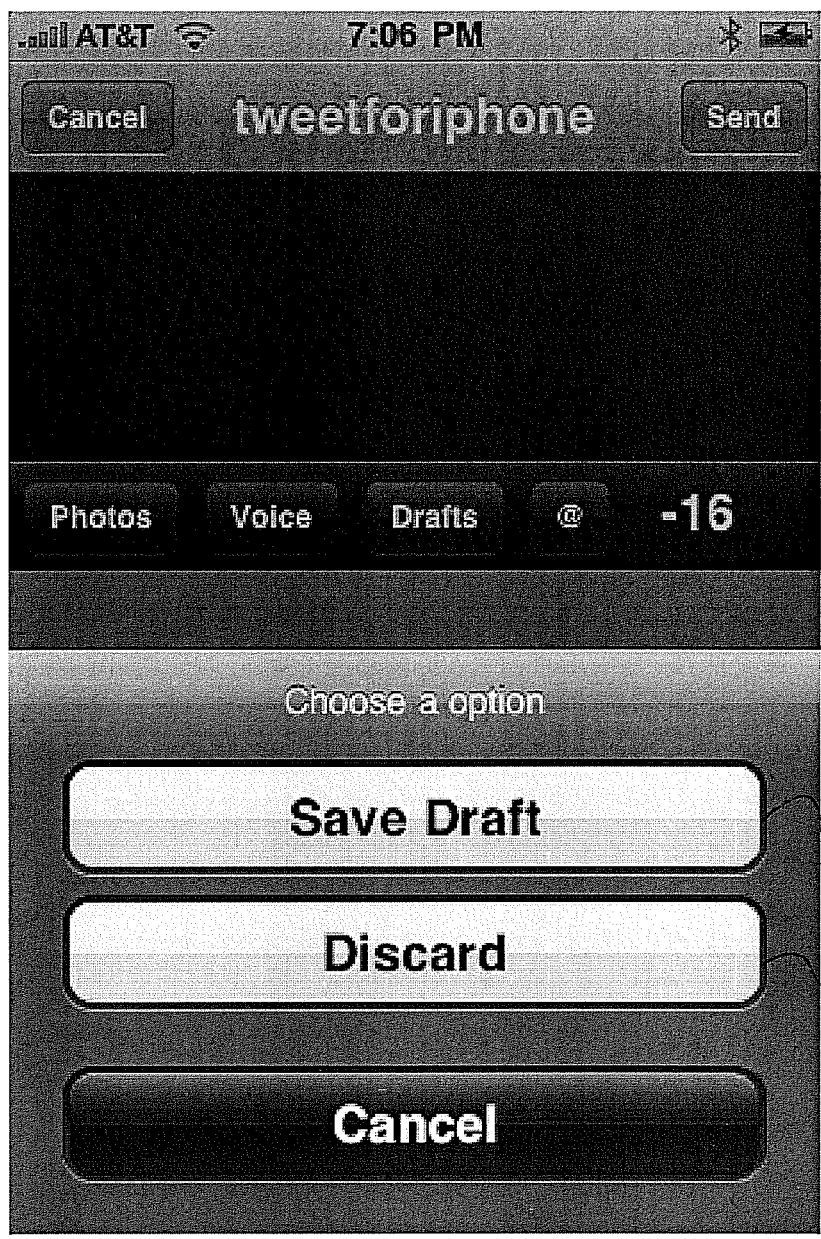
FIG. 13 is a graphic representation of the compose screen giving the user the option to save the composed text in the form of draft button 1302 or discard button 1304 in the mobile device messaging application 100 of the present invention.
Figure 14:
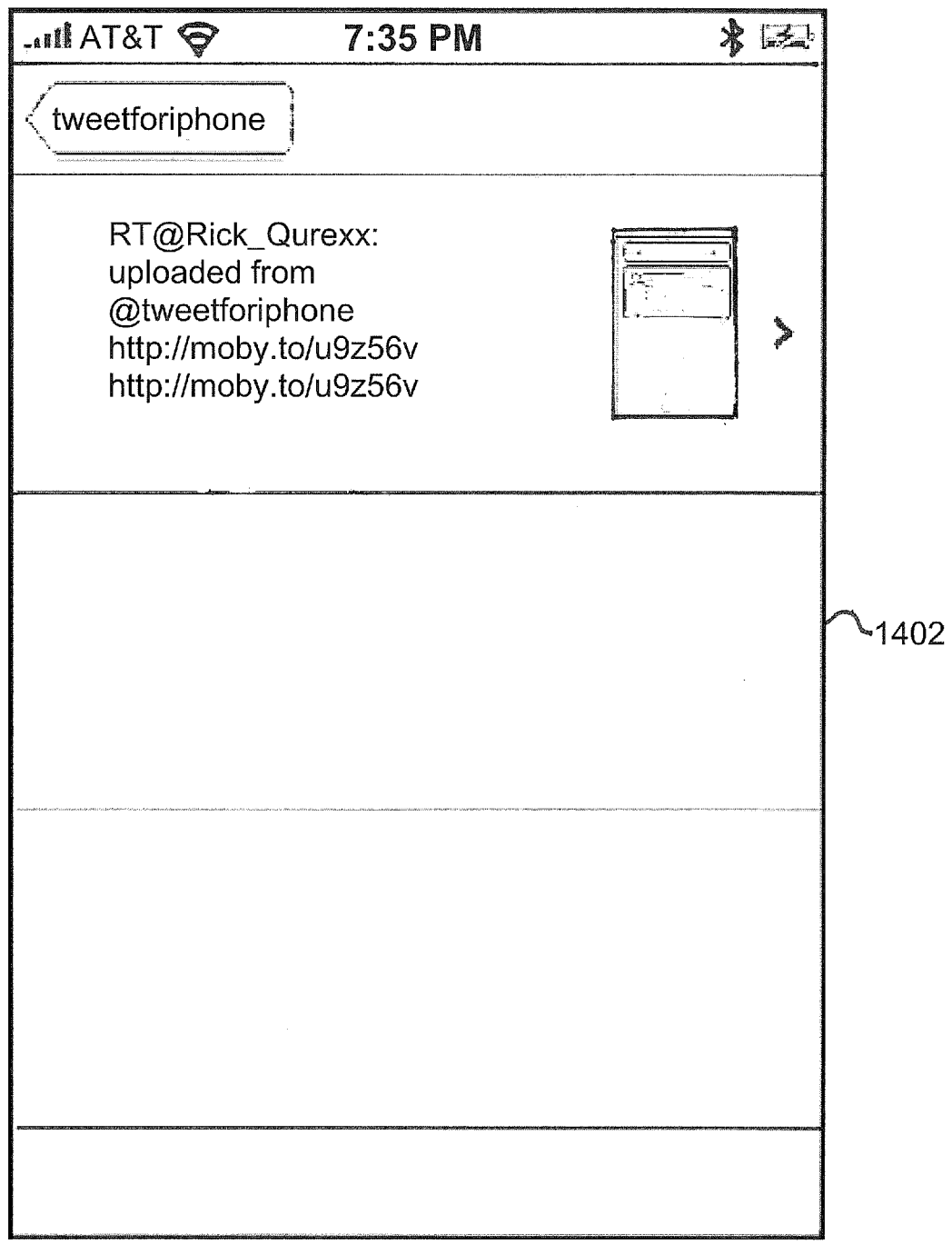
FIG. 14 is a graphic representation of the stored drafts screen 1402 of the mobile device messaging application 100 of the present invention.
Figure 15:
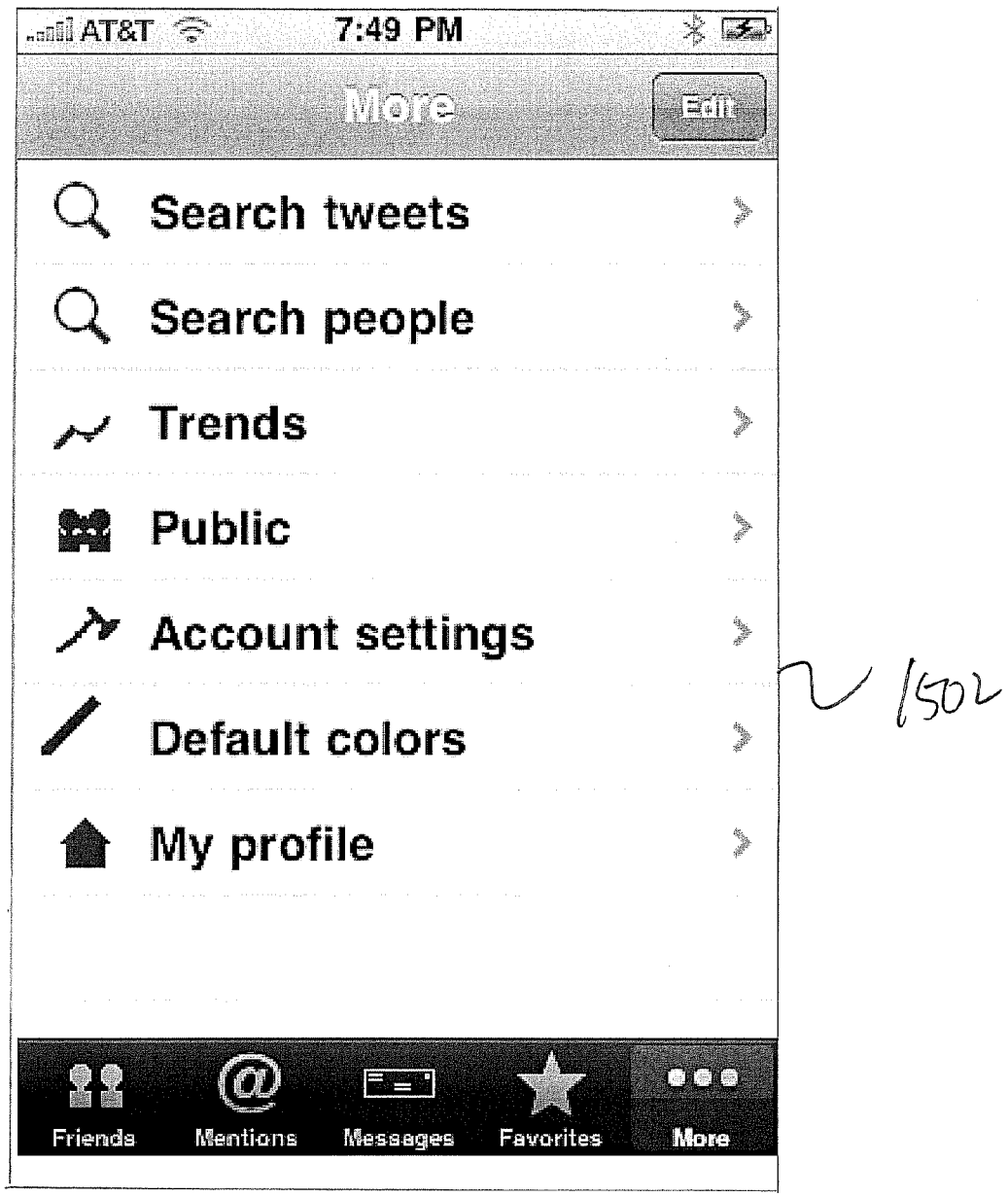
FIG. 15 is a graphic representation of the more tab options screen 1502 of the mobile device messaging application 100 of the present invention.
Figure 16:
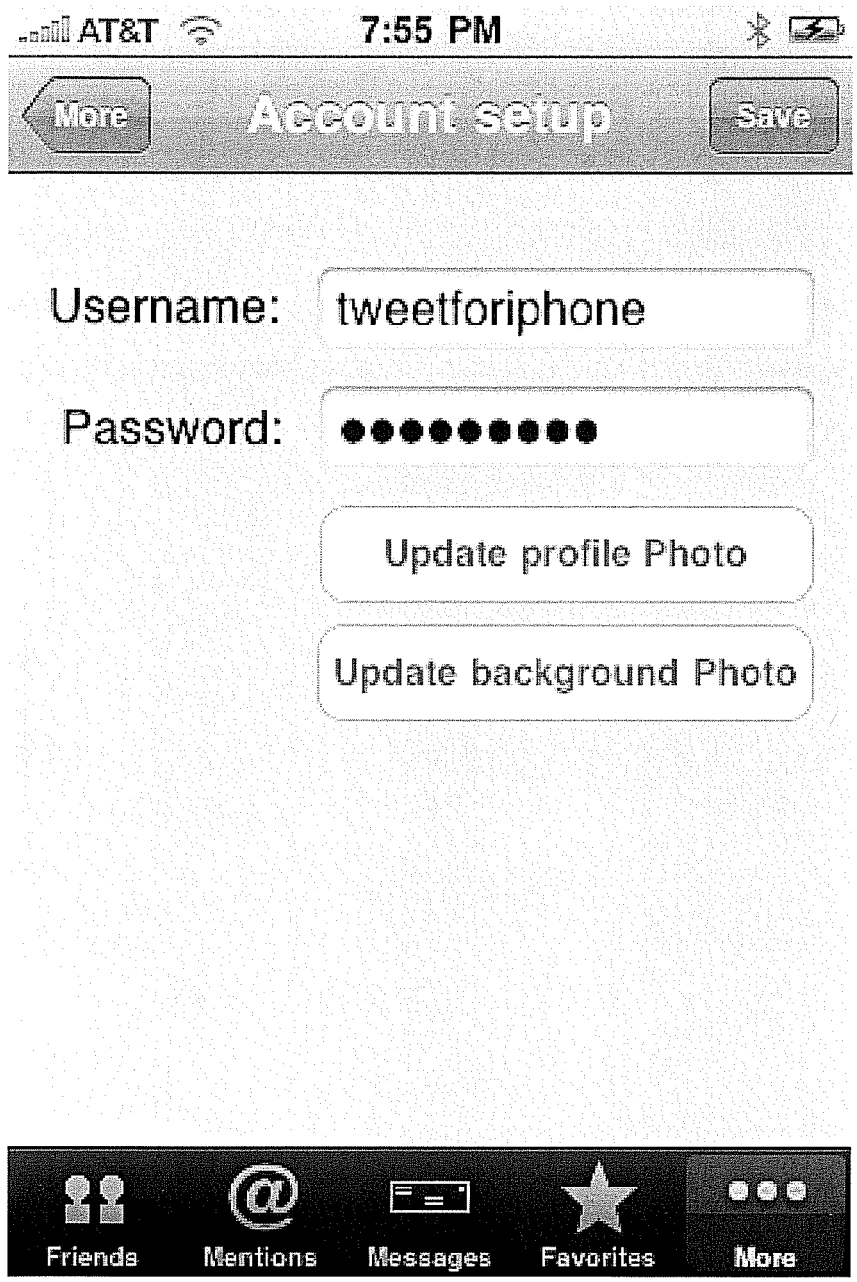
FIG. 16 is a graphic representation of the account setup screen 1602 of the mobile device messaging application 100 of the present invention.
Figure 17:
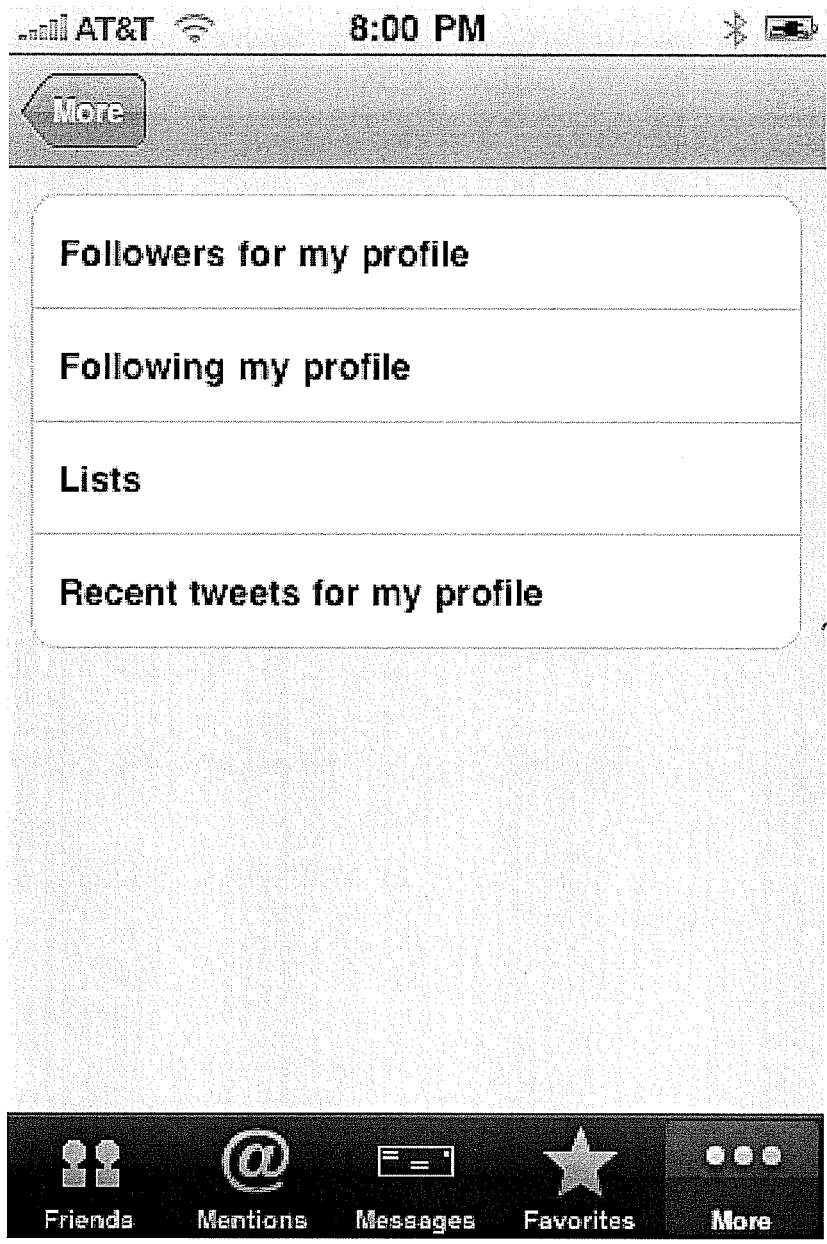
FIG. 17 is a graphic representation of the My Profile screen 1702 of the mobile device messaging application 100 of the present invention.
Figure 18:
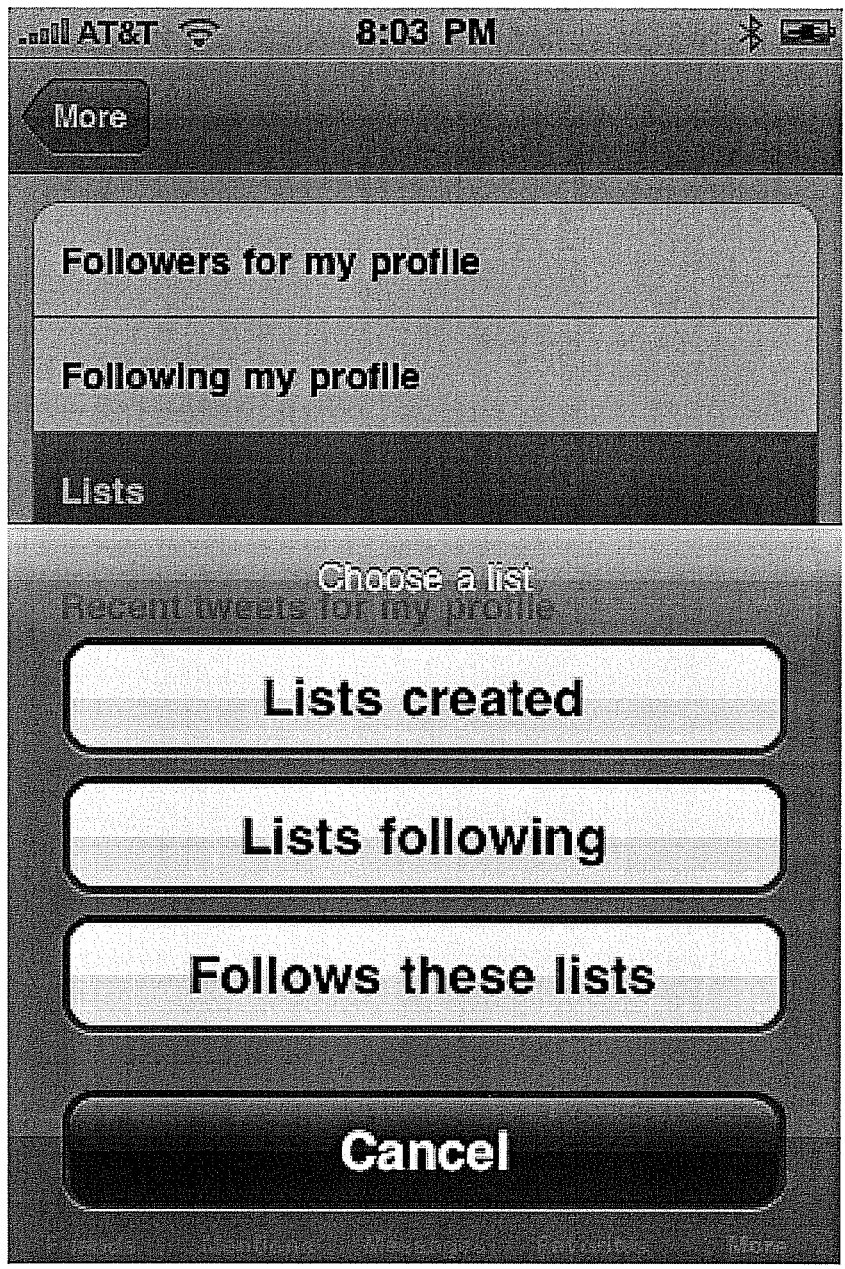
FIG. 18 is a graphic representation of the Choose a List screen 1802 of the mobile device messaging application 100 of the present invention.
Figure 19:
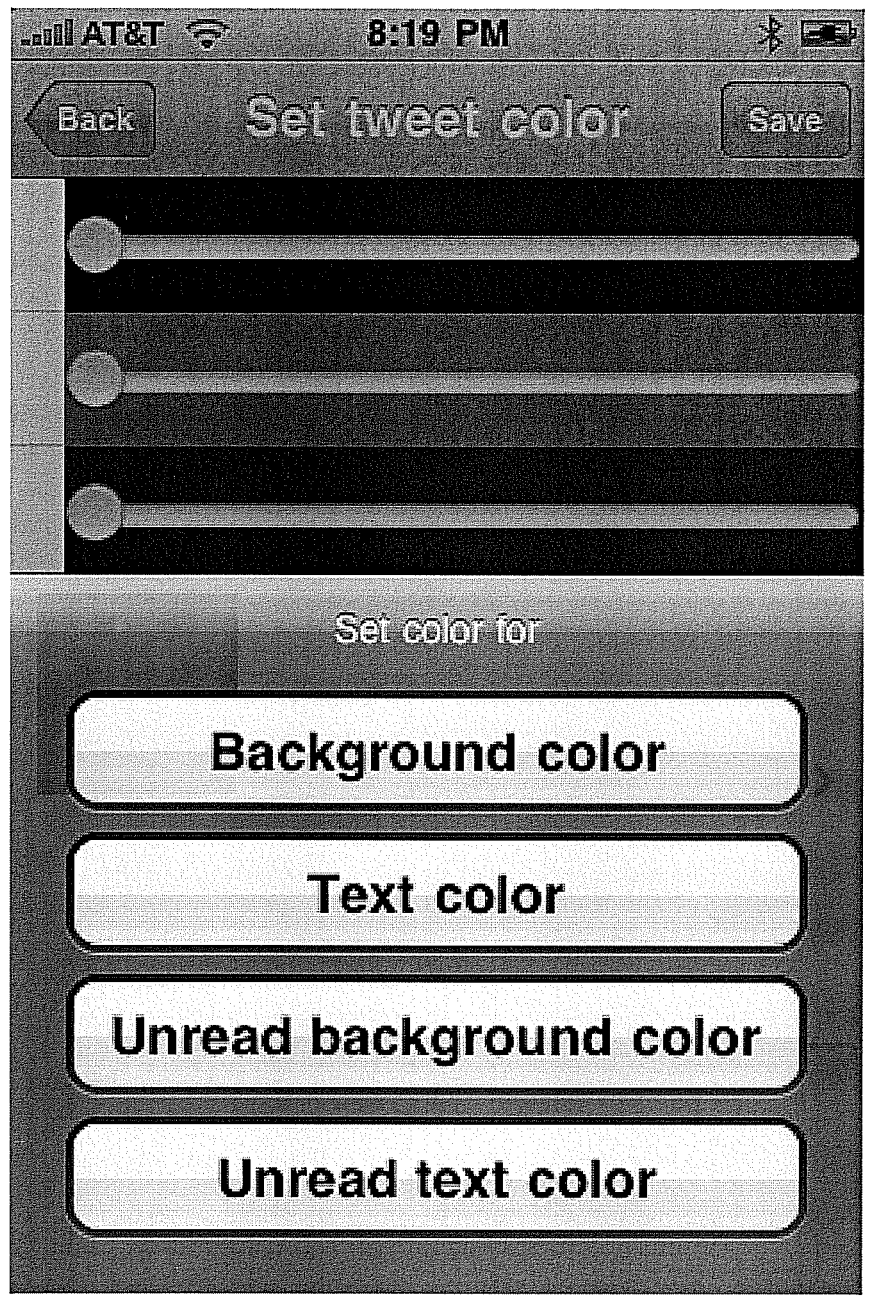
FIG. 19 is a graphic representation of the set tweet Color options screen 1902 of the mobile device messaging application 100 of the present invention.
Figure 20:
FIG. 20 is a graphic representation of the set tweet Color screen 2002 of the mobile device messaging application 100 of the present invention.
Figure 21:
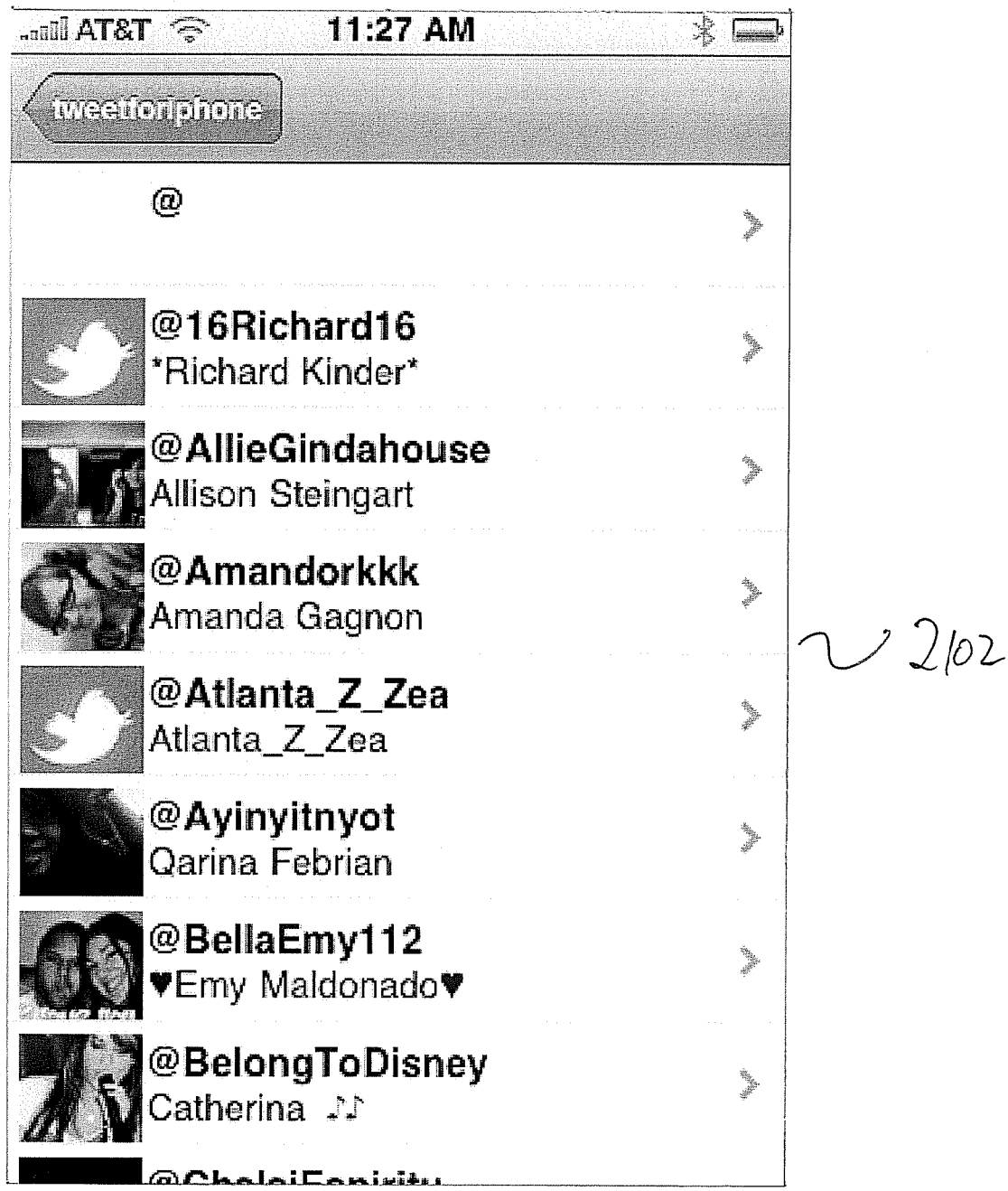
FIG. 21 is a graphic representation of the People picker screen 2102 of the mobile device messaging application 100 of the present invention.—what is unique about this apps people picker is that it generates the people list from the currently selected (displayed) timeline.

FIGS. 11-21 depict various screen displays of the present invention 100 providing different functions to users. FIGS. 11-21 are all self-explanatory as: FIG. 11 is a graphic representation of user more information screen display 1102 of the mobile device messaging application 100 of the present invention. FIG. 12 is a graphic representation of the compose screen turning red 1202 of the mobile device messaging application 100 of the present invention when the user exceeds the number of characters allowed for their message display. FIG. 13 is a graphic representation of the compose screen giving the user the option to save the composed text in the form of draft button 1302 or discard button 1304 in the mobile device messaging application 100 of the present invention. FIG. 14 is a graphic representation of the stored drafts screen 1402 of the mobile device messaging application 100 of the present invention. FIG. 15 is a graphic representation of the more tab options screen 1502 of the mobile device messaging application 100 of the present invention. FIG. 16 is a graphic representation of the account setup screen 1602 of the mobile device messaging application 100 of the present invention. FIG. 17 is a graphic representation of the My Profile screen 1702 of the mobile device messaging application 100 of the present invention. FIG. 18 is a graphic representation of the Choose a List screen 1802 of the mobile device messaging application 100 of the present invention. FIG. 19 is a graphic representation of the set tweet Color options screen 1902 of the mobile device messaging application 100 of the present invention. FIG. 20 is a graphic representation of the set tweet Color screen 2002 of the mobile device messaging application 100 of the present invention. FIG. 21 is a graphic representation of the People picker screen 2102 of the mobile device messaging application 100 of the present invention. It is unique about the people picker display 2102 of the present invention 100 is that it generates the people list from the currently selected (displayed) timeline.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A social networking mobile software application for particular mobile devices, using wireless connections to the internet and cellular provider data network, the social networking mobile software application comprising:
   A. Means to allow end users to view profiles of themselves on the particular mobile devices that contain visual contents while simultaneously hearing an audio description of their ad profile using streaming and intact multimedia file;
   B. Means to allow end users to compose, send, receive and view text messages to and from an online social network on the particular mobile devices;
   C. Means to allow end users to record, send, receive and playback voice and video messages on the particular mobile devices to other users after the initiating user selects the other user's profile utilizing the particular mobile devices' microphone and speaker via a WiFi/cellular data path;
   D. Means to allow end users on particular mobile devices to have a live conversation with each other, utilizing VoIP with a wireless internet connection or the cellular data path with VoIP after the initiating user selects on the other user's profile;
   E. Means to allow multiple end users to have a live conversation or pass voice messages on the particular mobile devices to other users using compatible mobile devices and social networking mobile software application, thereby multiple users forming a chat room by joining to the same social network;
   F. Means to allow end users to receive ads or profiles in the form of images and text while simultaneously listening to audio transferred to their wireless device via a wireless connection to the internet or via the cellular provider's data network over the internet from a server or set of servers;
   G. Means to allow end users of multiple wireless devices to send and receive voice messages to each other by selecting their ad or profile utilizing a wireless connection over the internet, or via the cellular provider's data network;
   H. Means for users to set custom colors for messages sent to specific recipients or received from specific senders, said means including tap slider selection scales for mixing desired amounts of red, green and blue primary colors and means for saving the custom colors;
   I. A plurality of default display screen themes and means by which to allow switching of the default display screen themes by shaking the particular mobile device, wherein the messages, voice messages, video messages, profiles and ads recorded, sent or received by end users are associated to and interconnected with the end users' existing online social networks.

2. The social networking mobile software application of claim 1, in which the particular mobile devices are selected from the group of: smart phones, tablet computers, notebook computers, desk top personal computers, netbook computers and other handheld, wireless devices.

3. The social networking mobile software application of claim 1, in which the voice and video messages recorded, sent or received by the end users via the WiFi/cellular path utilized by the users' mobile computing device are encoded in an intact multi-media file format selected from the group consisting of VoIP, WAV, VOX, WMV, MOV, and 3GG.

4. The social networking mobile software application of claim 1, in which the cellular provider's data network includes but is not limited to 3G networks.

5. The social networking mobile software application of claim 1, in which the cellular provider's data network includes but is not limited to 3G networks, who send and receive messages to and from wireless devices directly.

6. The social networking mobile software application of claim 1 further comprising eCommerce software.

7. The social networking mobile software application of claim 1, further comprising:
   means by which to allow screen displaying messages received from different accounts to be traversed by a "swiping gesture" on the particular mobile devices.

8. The social networking mobile software application of claim 1, further comprising:
   means by which to allow screen displaying messages received from different accounts to be traversed by arrow keys on mechanical or virtual keyboards in the particular mobile devices.

9. The social networking mobile software application of claim 1, further comprising:
   means by which to allow messages saved to existing contacts management applications in the mobile devices.

10. The social networking mobile software application of claim 1, further comprising:
   means by which to allow messages emailing originating from the social network.

11. The social networking mobile software application of claim 1, further comprising:
   means by which to allow integration with web browser in the mobile devices, wherefrom displaying web pages, photos and playing video and audio recording.

12. The social networking mobile software application of claim 1, further comprising:
   means to display in both portrait and landscape modes.

13. The social networking mobile software application of claim 1 in which end users can record, send, receive and playback voice and video messages on the particular mobile devices to other users running the same application.

14. A method for interaction between end users in social networks using a software application for particular mobile computing devices using wireless connections to the internet and a cellular provider data network wherein the software application for mobile computing devices comprises the following:
   A. Means to allow end users to view profiles of themselves on the particular mobile devices that contain visual contents while simultaneously hearing an audio description of their ad profile using streaming and intact multimedia file;
   B. Means to allow end users to compose, send, receive and view text messages to and from an online social network on the particular mobile devices;
   C. Means to allow end users to record, send, receive and playback voice and video messages on the particular mobile devices to other users after the initiating user selects the other user's profile utilizing the particular mobile devices' microphone and speaker via a WiFi/cellular data path;
   D. Means to allow end users on particular mobile devices to have a live conversation with each other, utilizing VoIP with a wireless internet connection or the cellular data path with VoIP after the initiating user selects on the other user's profile;
   E. Means to allow multiple end users to have a live conversation or pass voice messages on the particular mobile devices to other users using compatible mobile devices and social networking mobile software application, thereby multiple users forming a chat room by joining to the same social network;
   F. Means to allow end users to receive ads or profiles in the form of images and text while simultaneously listening to audio transferred to their wireless device via a wireless connection to the internet or via the cellular provider's data network over the internet from a server or set of servers; and
   G. Means to allow end users of multiple wireless devices to send and receive voice messages to each other by selecting their ad or profile utilizing a wireless connection over the internet, or via the cellular provider's data network;
   H. Means for users to set custom colors for messages sent to specific recipients or received from specific senders, said means including tap slider selection scales for mixing desired amounts of red, green and blue primary colors and means for saving the custom colors; and
   I. A plurality of default display screen themes and means by which to allow switching of the default display screen themes by shaking the particular mobile device, wherein the messages, voice messages, video messages, profiles and ads recorded, sent or received by end users are associated to and interconnected with the end users' existing online social networks, the method comprising the following steps:
   1. Displaying search results and playing an audio description for the first end user in the search results; and
   2. Automatically playing the audio description for the next end user or previous end user in the search result.

15. The method for interaction between end users of social networks of claim 14, further comprising the following step:
   3. Entering search criteria for other end users on a social network, said search criteria selected from the group of search criteria consisting of the end users' name, location, age, gender, social interests and professional interests.

16. The method for interaction between end users of social networks of claim 14, further comprising the following step:
   4. Sending an audio message to a selected end user.

17. The method for interaction between end users of social networks of claim 14, further comprising the following step:
   5. Automatically moving to the subsequent or prior ad and playing the audio description after the audio description finishes playing the selected index.

18. The method for interaction between end users of social networks of claim 14, further comprising the following step:
   6. Displaying search results in a list format as well as individually.

19. The method for interaction between end users of social networks of claim 14, further comprising the following step:
   7. Advancing to the next selection or returning to a prior selection by touching a button or swiping the screen.

* * * * *